June 21, 1938.  B. BAUMZWEIGER  2,121,725
CONDENSER TESTER
Filed May 2, 1936
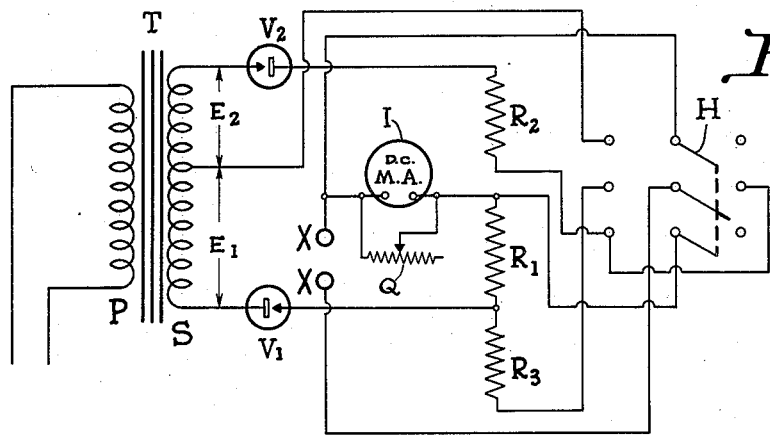
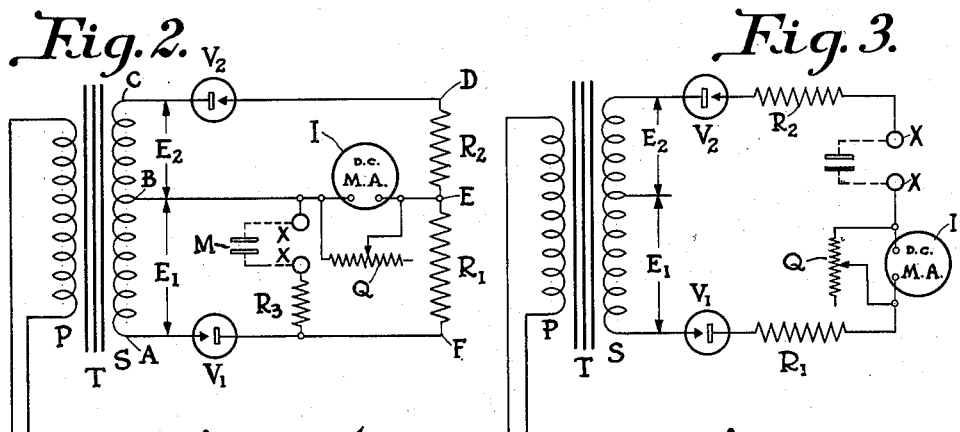
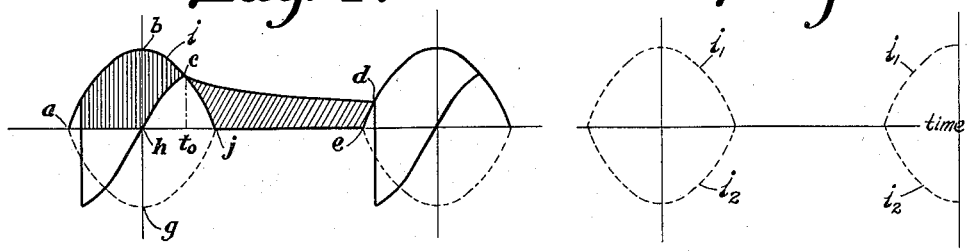
INVENTOR.
Benjamin Baumzweiger
BY Thomas S. Ross
ATTORNEY.

Patented June 21, 1938

2,121,725

UNITED STATES PATENT OFFICE 2,121,725

CONDENSER TESTER

Benjamin Baumzweiger, Cincinnati, Ohio, assignor of one-half to Floyd E. Hauss, Norwood, Ohio Application May 2, 1936, Serial No. 77,596

4 Claims. (Cl. 175—183)

My invention relates to improvements in condenser testers in general, but more particularly to the type of testers used for determining the following properties, namely, capacity, breakdown and leakage.

It is the object of my invention to provide a method and apparatus for testing condensers which will utilize a D. C. milliammeter for registering all of the tests capable of being performed upon the device.

Another object of my invention is to measure the capacity of a condenser by what I term the "Partial discharge method", which will be fully explained later.

Still another object of my invention is to provide a condenser tester which will indicate the amount of "leakage" on a meter, rather than by use of the so called neon tube flash test which indicates the presence but not the amount of leakage.

Still further objects of my improved condenser tester are that it is entirely fool proof; no vibrating contacts are used; and that it is simple, efficient, and economical to build.

Various objects and advantageous features of my invention may be seen in the following description, and one embodiment thereof may be seen in the accompanying drawing wherein similar characters of reference designate corresponding parts, and wherein:

Fig. 1 is a schematic diagram representing the arrangement and the electrical circuits of the device which forms one embodiment of my invention;

Fig. 2 is a simplified or equivalent schematic diagram of Fig. 1 showing the electrical circuits with the switch thrown to the left, which is the position of the switch when testing the capacity of condensers;

Fig. 3 is an equivalent schematic diagram of Fig. 1 showing the completed electrical circuits with the switch thrown to the right, which is the position of the switch when performing breakdown and leakage tests upon condensers;

Fig. 4 is a graph representing my partial discharge method, and

Fig. 5 is a graph representing the two fictitious currents flowing in the branch B—E later described in detail.

Referring now more in detail to the drawing, the device shown in Fig. 1 includes a triple pole double throw switch H, the sole purpose of which is to rearrange the component parts of the instrument to perform the duties specified above, the left hand position being used when testing condensers for capacity, and the right hand position being used when testing condensers for breakdown and leakage. It should be noted, however, that any other suitable device could be used for performing this rearrangement of circuits without interfering in the least with the scope or spirit of my invention. For simplicity in explaining the functioning of my improved condenser tester, I have illustrated separate diagrams showing the equivalent circuits with the switch H thrown to the left and with said switch thrown to the right hand positions represented by Figs. 2 and 3 respectively.

Referring for the present to Fig. 2, the reference character T designates a transformer. The secondary of transformer T is designated S and a tap divides the secondary winding into two portions giving the voltages $E_1$ and $E_2$ which do not have to be equal to each other. $V_1$ and $V_2$ are two electrical rectifiers such for example as half wave rectifiers, which will allow the current to flow preferentially in one direction only, as that shown by the arrows, although if the direction shown were reversed in both elements the function of the instrument would not be affected in the least. I desire to point out at this time that should these two rectifiers be placed within one container the basic principles of my invention would not be affected.

$R_1$ and $R_2$ represent two resistances whose relative sizes are chosen in such a manner that they correspond with the relative sizes of the potentials $E_1$ and $E_2$. If such a relation exists, the accepted laws of electrical science state that there will be no potential difference between the point B at the secondary of the transformer and the point E at the junction of the two resistances.

A direct current measuring device hereinafter referred to as the D. C. milliammeter designated I is connected between the point B of the transformer and the point E between the resistances $R_1$ and $R_2$. Since there is no difference of potential between these two points, there will be no tendency for current to flow and this being true the D. C. milliammeter will indicate zero. The explanation thus far is given with the assumption that the condenser to be tested is not connected to the test terminals X—X. Let us assume now that the condenser designated M to be tested, is connected to the test terminals X—X as illustrated in Fig. 2. The condenser will become charged with a quantity of electricity dependent upon its capacity and the maximum voltage applied during a part of the cycle of the alternating current, and will discharge through the resistance $R_1$ for the remainder of the cycle, a part of that discharge being registered on the D. C. milliammeter I, hence the name "Partial discharge method".

In order to explain the functioning of my improved condenser tester in a clearer manner, it has been found convenient to consider the circuit composed of two superimposed simple circuits, namely ABEF and CDEB. Under such an assumption there will be two fictitious currents flowing in the branch B—E, which, when the condenser to be tested is not in the circuit, are of equal magnitudes and of opposite directions, hence cancelling each other. Referring now to Fig. 5, $i_1$ represents the fictitious current due to the circuit ABEF and the inverted wave $i_2$ represents the fictitious current CDEB, and since they are equal in amount and opposite in direction, the net result on the D. C. milliammeter I will be zero. It should be noted that by adjusting the resistances $R_1$ and $R_2$, one or both of these fictitious currents can be made to change the magnitudes, and the real current flowing in the circuit would always be the difference between them. This condition of equilibrium is changed, however, when the condenser to be tested is connected to the test terminals X—X. Referring to the graph shown in Fig. 4 which is drawn under the assumption that the transformer supplying the voltages $E_1$ and $E_2$ has no resistance or leakage reactance, that the condenser tested is a perfect capacitor, that impedances $R_1$ and $R_2$ are perfect resistances, and that the preferential conductivity units $V_1$ and $V_2$ are perfect rectifiers, that is, having a zero resistance in one direction of the flow of current, and infinite resistance to the other direction of flow of current. The condenser M will be receiving a charging current until the maximum voltage $E_1$ is reached and maximum current flows through the resistance $R_1$ and then will start discharging along the line $hc$ which is the general equation $$i_m R 2\pi f C \sin 2\pi f t \qquad (I)$$

Where:
 $i_m$ is the maximum current flowing in resistance $R_1$ in amperes
 $R_1$ is the value of resistance $R_1$ in ohms
 $f$ is the frequency of the voltage $E_1$ in cycles per second
 $C$ is the capacity of the condenser tested, in farads
 $t$ is time in seconds, measured from the point $h$
 $\pi$ 3.14159...

The discharge of the condenser will continue along the line represented by the equation given above until a time $t_0$ is reached, which is given by the equation $$t_0 = \frac{\arc\tan \frac{1}{2\pi f R_1 C}}{2\pi f} \qquad (II)$$

And from that time on it will go along the line $cd$ which is of the general form $$(i_m \cos 2\pi f t_0)(\epsilon)^{-\frac{t_t}{R_1 C}} \qquad (III)$$

Where all the terms have the same significance as in the Equations (I) and (II), and in addition $t_t$ is time counted from the time $t_0$
 $\epsilon$ is the base of natural logarithms=2.71828...

The resistance $R_3$ shown on Figs. 1, 2 and 3 is placed there for protection of the transformer and rectifier unit, in case the terminals X—X should become short-circuited. It has no effect however upon the graph of Fig. 5, and a very small effect upon the reasoning and equations pertaining to Fig. 4, because its size is small compared with the resistance $R_1$.

If now the fictitious current due to the circuit CDEB is superimposed upon that due to the circuit ABEF with a condenser connected between the test terminals X—X as shown in Fig. 2, the portion shown as $agj$ in Fig. 4 will cancel the portion shown as $abj$. The actual quantity of electricity remaining is that enclosed inside of the figure $jcde$, and is the only quantity which will actually flow through the D. C. milliammeter during one cycle. The deflection of the pointer in the D. C. milliammeter will be the area enclosed by the figure $jcde$ divided by the duration of one cycle in seconds, that is, $$\frac{1}{f}$$

sec. It is evident from a study of the Equations I and II that the magnitude of this reading will be dependent upon the constants $i_m$ (which is dependent in turn upon the constants $E_1$ and $R_1$), and $R_1$, and also upon the amount of capacity of condenser M being tested. Therefore, it is possible to use this reading as a measure of the condenser capacity with great advantage over the conventional capacitative reactance method as explained later.

Referring again to Fig. 2, if the part of the circuit termed as BCDE were not existent, the actual current passing through the milliammeter without the condenser inserted at the terminals X—X, would be that represented by the curve "$abj$" on Fig. 4. Upon insertion of the condenser M to the said terminals X—X the increase of the quantity of current passing through the DCMA would be represented by the portion $cdej$ of the Fig. 4, and this increase could be used as a measure of the condenser capacity, however without the advantages of the "partial discharge" method outlined above.

Referring now to Fig. 3 which is a diagram of the electrical circuits with the switch H thrown to the right, the instrument will be ready to perform breakdown and leakage tests upon condensers. The secondary voltage of the transformer is rectified by the rectifiers $V_1$ and $V_2$, both rectifiers being used merely to facilitate the switching arrangement shown in Fig. 1 and it should be noted that only one rectifier is needed for conducting these particular tests, namely, breakdown and leakage. In this circuit the alternating current components of the rectified wave will not register on the D. C. milliammeter, and the direct current passing will be proportional to the leakage conductance of the condenser tested. It will be readily apparent, therefore, to those skilled in the art, that my improved condenser tester utilizes a D. C. milliammeter for measuring capacity by the partial discharge method described above and also for the amount of leakage and breakdown just described. If the amount of leakage is infinite, that is, the terminals X—X are short-circuited, the resistances $R_1$ and $R_2$ may be made to be of such an amount that a full scale reading be obtained on the D. C. milliammeter with normal voltage applied to the primary of the transformer, and the sensitivity of the D. C. milliammeter may be adjusted by means of a shunt Q or similar device to give correct reading for variable line voltages. If the condenser cannot stand the voltage applied, that is, $E_1$ plus $E_2$, a breakdown of the insulation will occur, which will virtually short-circuit terminals X—X thereby causing full deflection of the meter, hence performing the breakdown test of a condenser. An advantage of my improved condenser tester is that if a condenser be leaky, the reading of capacity as measured by the partial discharge method will be lower rather than higher as in capacitative reactance method where a condenser is placed in series with an A. C. source of supply and an A. C. meter. If the condenser is good, the current indicated by the meter will be an indication of the capacity. Another advantage of my improved condenser tester is that my method makes it possible to test the capacity and leakage of electrolytic condensers at the rated working voltage in a simple manner. The only other known method of accomplishing this result is by the use of a ballistic galvanometer, which is essentially a laboratory instrument, not suitable for field work. Still another advantage of my invention is that the amount of leakage is indicated on a meter, rather than by the use of the so called "neon tube flash test" which indicates the presence but not the amount of leakage. A still further advantage of my improved condenser tester is that only one current meter is used for performing all of the tests which the instrument is capable of performing and that the instrument is entirely fool proof and has no vibrating contacts.

By proper adjustment of resistances $R_1$, $R_2$ and $R_3$ it is possible to obtain an approximately logarithmic scale of capacity hence the probable error will be constant for all positions of the pointer on the scale.

Having thus fully described my invention, what I claim as new and desire to secure by Letters Patent is:

1. In a condenser tester, in combination, a condenser to be tested, a source of alternating current, two rectifiers connected in series conjunction across said source, two resistances connected in series in the circuit of and between said rectifiers, a direct current meter, said meter being connected between the junction of said resistances and a point between the ends of said source, means to removably connect a condenser to be tested between said point and one of said rectifiers, the location of said point being such as to reduce the current in said meter to zero upon the removal of said condenser.

2. In a condenser tester, in combination, a condenser to be tested, a source of alternating current at a maximum potential difference which may comprise a breakdown test for said condenser, two rectifiers connected in series conjunction across said source, a direct current meter, two resistances connected in series in the circuit of and between said rectifiers, and switching means whereby said meter may be connected from the junction of said resistances to a chosen point between the ends of said source and said condenser may be connected between one of the rectifiers and said point, or whereby said condenser and the meter may be connected in series in the circuit of said rectifiers and said resistances.

3. A condenser tester comprising a transformer having a primary and secondary winding, said primary winding being adapted to be connected to a source of alternating current, said secondary winding having an intermediate tap, rectifiers connected with respective ends of the secondary, a resistance connecting the rectifiers, a direct current meter connected between said tap and a point intermediate the ends of said resistance, said point being selected to cause the meter to normally indicate zero flow, and means to connect a condenser to be tested between said tap and one of said rectifiers.

4. A condenser tester comprising a transformer having a secondary winding provided with an intermediate tap, means connected to one end of said secondary winding to permit current flow from said winding, and means connected to the other end of said winding to prevent current flow to said winding, a connector between said means, an ammeter connected between said connector and said tap, said connector arranged and adapted to cause the ammeter to normally register zero when an alternating current is supplied to the transformer, and means whereby a condenser to be tested may be connected between one of said means and said tap.

BENJAMIN BAUMZWEIGER.